United States Patent
Sial et al.

(10) Patent No.: US 11,095,772 B2
(45) Date of Patent: Aug. 17, 2021

(54) DEVICE LOGIC ENHANCEMENT FOR NETWORK-BASED ROBOCALL BLOCKING

(71) Applicant: T-Mobile USA, Inc., Bellevue, WA (US)

(72) Inventors: Muhammad Ejaz Sial, Snoqualmie, WA (US); Shujaur Mufti, Snoqualmie, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 201 days.

(21) Appl. No.: 16/389,625

(22) Filed: Apr. 19, 2019

(65) Prior Publication Data

US 2020/0336588 A1    Oct. 22, 2020

(51) Int. Cl.
*H04M 3/436* (2006.01)
*H04M 3/42* (2006.01)
*H04M 7/00* (2006.01)

(52) U.S. Cl.
CPC ....... *H04M 3/436* (2013.01); *H04M 3/42059* (2013.01); *H04M 7/0078* (2013.01); *H04M 2203/2027* (2013.01)

(58) Field of Classification Search
None
See application file for complete search history.

(56) References Cited

U.S. PATENT DOCUMENTS

| | | | |
|---|---|---|---|
| 2008/0298574 A1* | 12/2008 | Koch | H04M 3/436 379/210.02 |
| 2014/0128047 A1* | 5/2014 | Edwards | H04W 4/14 455/415 |
| 2017/0048388 A1* | 2/2017 | Sharpe | H04M 3/436 |
| 2017/0118335 A1* | 4/2017 | Brackett | H04M 3/436 |
| 2018/0007194 A1* | 1/2018 | Hodge | H04M 3/4365 |
| 2018/0191896 A1* | 7/2018 | Beardow | H04M 1/72583 |
| 2018/0249006 A1* | 8/2018 | Dowlatkhah | H04W 16/18 |
| 2018/0324299 A1* | 11/2018 | Sial | H04W 4/16 |
| 2020/0259954 A1* | 8/2020 | Gupta | H04W 12/10 |

\* cited by examiner

*Primary Examiner* — Harry S Hong
(74) *Attorney, Agent, or Firm* — Lee & Hayes, P.C.

(57) ABSTRACT

Systems and methods for network-controlled scam/robocall handling are described. When an incoming call for a user device is received, a user may elect to add the originating number of the incoming call to a block list or a report list at the network level. Future calls from the originating number, if placed on the block list, are then blocked by the network from being received by the user device. Numbers on the report list may be moved by the user from the report list to the block list, and numbers on the block list may be moved from the block list to the report list. Also, the user may request additional information in order to determine whether to add the originating number to the block list or the report list.

17 Claims, 10 Drawing Sheets

DEVICE LOGIC ENHANCEMENT FOR NETWORK-BASED ROBOCALL BLOCKING

BACKGROUND

Scam calls and robocalls, which may include pre-recorded and/or autodialed calls, are unwelcome to many mobile device users. User-defined call blocking using original equipment manufacturer (OEM) native features can be used to block calls from known numbers.

Currently, when a user of a mobile device wishes to block particular callers, e.g., robocallers or scammers, the only option is to save a call from a particular caller in the call history log of the mobile device into the user's contact library. Then, in the menu for the contact library, an option may be presented for blocking the particular caller, e.g., the particular phone number. Future calls from the particular number are thus blocked by the mobile device in future instances. However, this can be cumbersome for the user to block unwanted calls from various numbers and can be unreliable.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
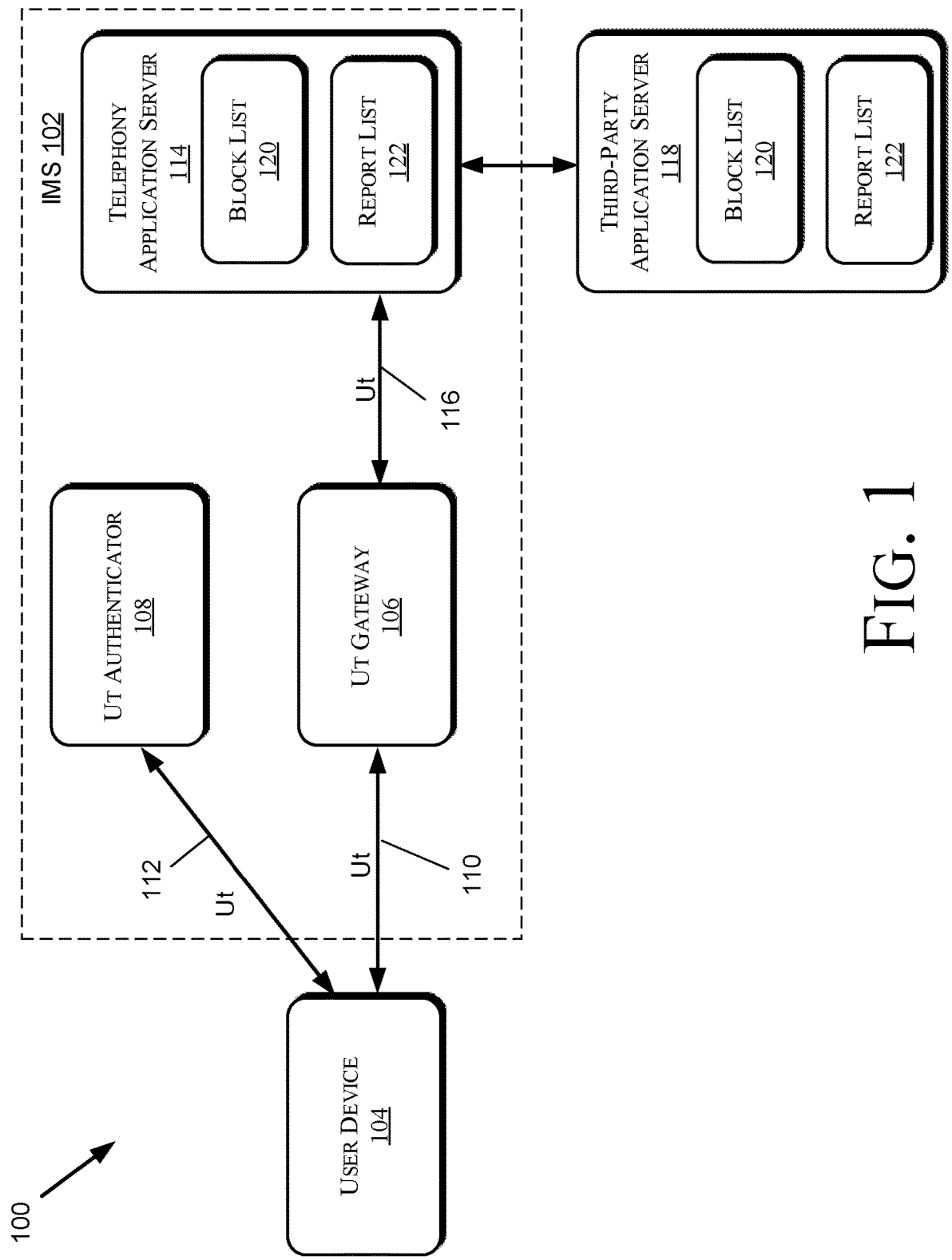
FIG. 1 is a pictorial diagram of a portion of an example communication network configured to implement network-controlled scam/robocall handling, as well as other potential unwanted calls, in accordance with various configurations.

Systems and methods discussed herein are directed to network-based handling of scam calls and robocalls, as well as other potential unwanted calls, at the network level within a wireless communication network.

In the described example configurations, individual users can subscribe to a call blocking service offered by the wireless communication network (also referred to herein as "network"), or may receive the call blocking service automatically without subscription. With the call blocking service, when the network receives a call destined for the user, the network first checks to see if the call is originating from a known robocaller, scammer, or other defined bad actor. In various example configurations, scam calls or robocalls may be automatically blocked or may be blocked or otherwise handled based on user-specified preferences. For example, if a user specifies that all robocalls are to be blocked, if it is determined by the network that an incoming call is from a known bad actor, then the call is blocked. As another example, a user may specify particular ways in which a call is to be handled, depending on a category with which the originating number is associated. For example, the user may choose to send political calls to a voicemail, but block calls from telemarketers.

In accordance with configurations, the user may selectively block calls from various numbers based on interacting with a user interface (UI) that may appear on a display of the user's mobile device. For example, when an incoming call is from a known bad actor (known as a bad actor by the user or identified as such by the network on the display of the user's mobile device), a UI may appear on the display of the user's mobile device with which the user may interact to add the number to a list of numbers that the user wishes to have future calls from blocked by the network. The UI may also appear on the display of the user's mobile device when the user is on another call during the incoming call. Additionally, the blocking of the number may also include blocking calls from other numbers associated with the known bad actor, e.g., block calls based upon the identity of the known bad actor.

In configurations, an option to block future calls from a particular number may be presented to the user when the user is reviewing a call history log on his mobile device. The user may select a UI to block future calls from the particular number and/or all numbers associated with the party associated with the particular number.

In configurations, when a particular number and/or a particular party is selected to be blocked by interacting with the block UI, the user may be prompted as to how long the user wishes for the particular number and/or particular party to be blocked, e.g., six hours, 24 hours, one week, permanently, etc. After the selected amount of time has expired, the telephony application server (TAS) may then once again allow calls from the blocked number and/or particular party to be forwarded to the user's mobile device.

When the user blocks calls from a particular number and/or a particular party associated with the particular number, the mobile device may push the desired blocking option along a Ut interface of the wireless communication network to a TAS of the wireless communication network. The TAS may then block future calls from the particular number and/or all numbers associated with the particular party associated with the particular number. Thus, instead of the mobile device blocking incoming calls from a particular number, the network itself may block the call from proceeding to the mobile device.

In configurations, a further option may be provided to the user to report a phone number. The reported phone number may be passed along the Ut interface to the TAS and placed on a list of reported numbers for the user. In configurations, the user may interact with an interface, e.g., an internet interface, to move numbers from the report list to the block list. Thus, for example, a number on the report list may be moved to the block list so that future calls from the number will be blocked. The user may also indicate that all numbers associated with a particular party associated with a particular number are to be moved to the block list. The user may then at a future date interact with the interface to move the number(s) from the block list to the report list so that calls from that number will be forwarded by the TAS to the user's mobile device.

In configurations, when a call from a particular number is received by a user on their mobile device, a UI may be provided for the user to request additional information. The request for additional information may be passed along the Ut interface to the TAS or to an authenticator. The TAS or the authenticator may provide additional information along the Ut interface as to the type of party from which the call is being received, e.g., a telemarketer, a politician, etc., back to the user's mobile device and the user device may reject the call, accept the call, report the call or block the call.

In configurations, while blocked calls may not be forwarded to the user's mobile device, an indication may be provided by the network in the user's call history log that a call was attempted by a blocked number (or another number of a blocked party). Thus, an option may be provided within the call history log for the user to unblock the number and/or party.

Network-based blocking of calls at the network level benefits the user in that unwanted calls received at the user's mobile device are reduced. Furthermore, use of network resources and mobile device resources is reduced. For example, network bandwidth is not used to deliver calls that are known to be unwanted by the user. On the mobile device, radio resource utilization and battery utilization are improved. For example, in the case of a mobile device configured as an Internet of Things (IoT) device, if the mobile device is in an idle mode, the mobile device will not switch to an active mode to receive unwanted scam or robocalls. Accordingly, battery life will improve.

FIG. 1 illustrates a portion of an example wireless communication network (also referred to herein as "network") 100 in which network-controlled handling of robocalls, scam calls, unwanted calls, calls from known bad actors, e.g., telemarketers, political calls, etc., can be implemented. The example network 100 includes an Internet Protocol (IP) Multimedia Subsystem (IMS) core 102, and one or more user devices 104, which may be in the form of mobile computing devices (also referred to herein as mobile devices). The IMS core 102 includes Ut interface gateway 106 and Ut authenticator 108 in communication with the one or more user devices 104 via Ut interfaces 110 and 112, respectively. The IMS core 102 also includes Telephony Application Server (TAS) 114, which is in communication with the Ut gateway 106 via Ut interface 116. The Ut interfaces facilitate the management of subscriber information related to services and settings for users and their user devices 104 within the wireless communication network 100. The Ut interface gateway 106 relays requests from a user device 104 to the TAS 114. The Ut authenticator 108 authenticates the user device 104 before allowing any interrogation, e.g., an Extensible Markup Language (XML) Configuration Access Protocol (XCAP) based GET message or XCAP PUT or POST request. The example network environment 100 may also include one or more third-party application servers 118 in communication with the TAS 114.

As is known, the wireless communication network 100 includes other components and interfaces that are not illustrated.

When a user device 104 connects to the network 100, the TAS 114 authenticates the user device and accesses a subscriber profile data repository (not illustrated) to access a user profile associated with the user device 104. The subscriber profile data repository includes supplementary service subscriptions for a user of the user device 104, enabling the TAS 114 to determine any supplementary services to which the user of the user device 104 is subscribed.

For example, in configurations, individual users can subscribe to a call blocking service offered by the example network 100, or may receive the call blocking service automatically without subscription from the network 100. With the call blocking service, when the network 100 receives a call destined for the user device 104, the TAS 114 first checks to see if the call is originating from a known robocaller, scammer, or other defined bad actor. In various example configurations, scam calls or robocalls may be automatically blocked or may be blocked or otherwise handled based on user-specified preferences. For example, if a user of the user device 104 specifies that all robocalls are to be blocked, if it is determined by the TAS 114 that an incoming call is from a known bad actor, then the call is blocked. As another example, the user may specify particular ways in which a call is to be handled, depending on a category with which the originating number is associated. For example, the user may choose to send political calls to a voicemail, but block calls from telemarketers. As will be discussed further herein, the TAS 114 and/or the third-party application server 118 may store a block list 120 for storing numbers and/or parties associated with numbers for which incoming calls to the user device 104 are to be blocked and a report list 122. The user provides the numbers for the block list 120 and the report list 122.

Figure 2A:
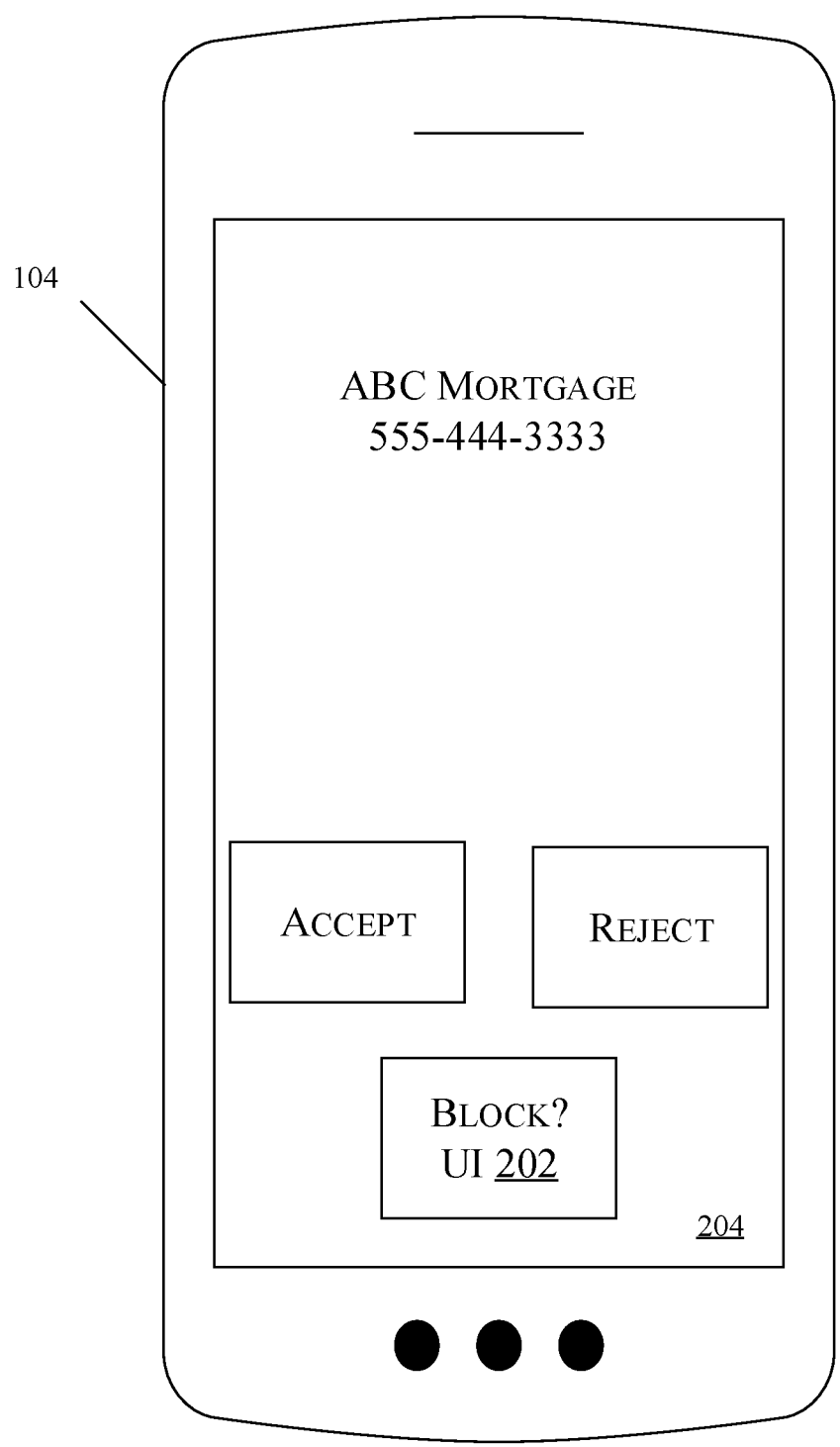
FIGS. 2A-2D are pictorial diagrams of an example user device configured to provide user interfaces (UIs) to a user when receiving calls to implement network-controlled scam/robocall handling, as well as other potential unwanted calls, in accordance with various configurations.

Referring to FIG. 2A, in accordance with configurations, the user may selectively block calls from various originating phone numbers based on interacting with a User Interface (UI) 202 that may appear on a display 204 of the device 104. For example, when an incoming call is from a known bad actor (known as a bad actor by the user or identified as such by the network 100 on the display 204 of the user's mobile device), the UI 202 may appear on the display 204 of the user's mobile device 104 such that the user may interact with the UI 202 to add the number to the block list 120 of numbers that includes originating numbers that the user wishes to have future calls from blocked. In the example of FIG. 2A, the caller is identified as "ABC Mortgage," which may be known to the user as a bad actor, e.g., a telemarketer. In other examples, caller may be identified on the display 204 by the network as "Scam or Fraud." The UI 202 may also appear on the display 204 of the user's mobile device 104 when the user is currently on another call. Additionally, the blocking of the originating number may also include blocking calls from other originating phone numbers of the known bad actor, e.g., block calls based upon the identity of the known bad actor "ABC Mortgage." The blocked phone number and/or the identity of the bad actor may be passed along the Ut interfaces 110, 116 to the TAS 114 and placed on a list of blocked numbers for the user. In particular, an XCAP based PUT or POST message may be forwarded to the TAS 114 and/or the third-party application server 118 for updating the block list 120.

Figure 2B:
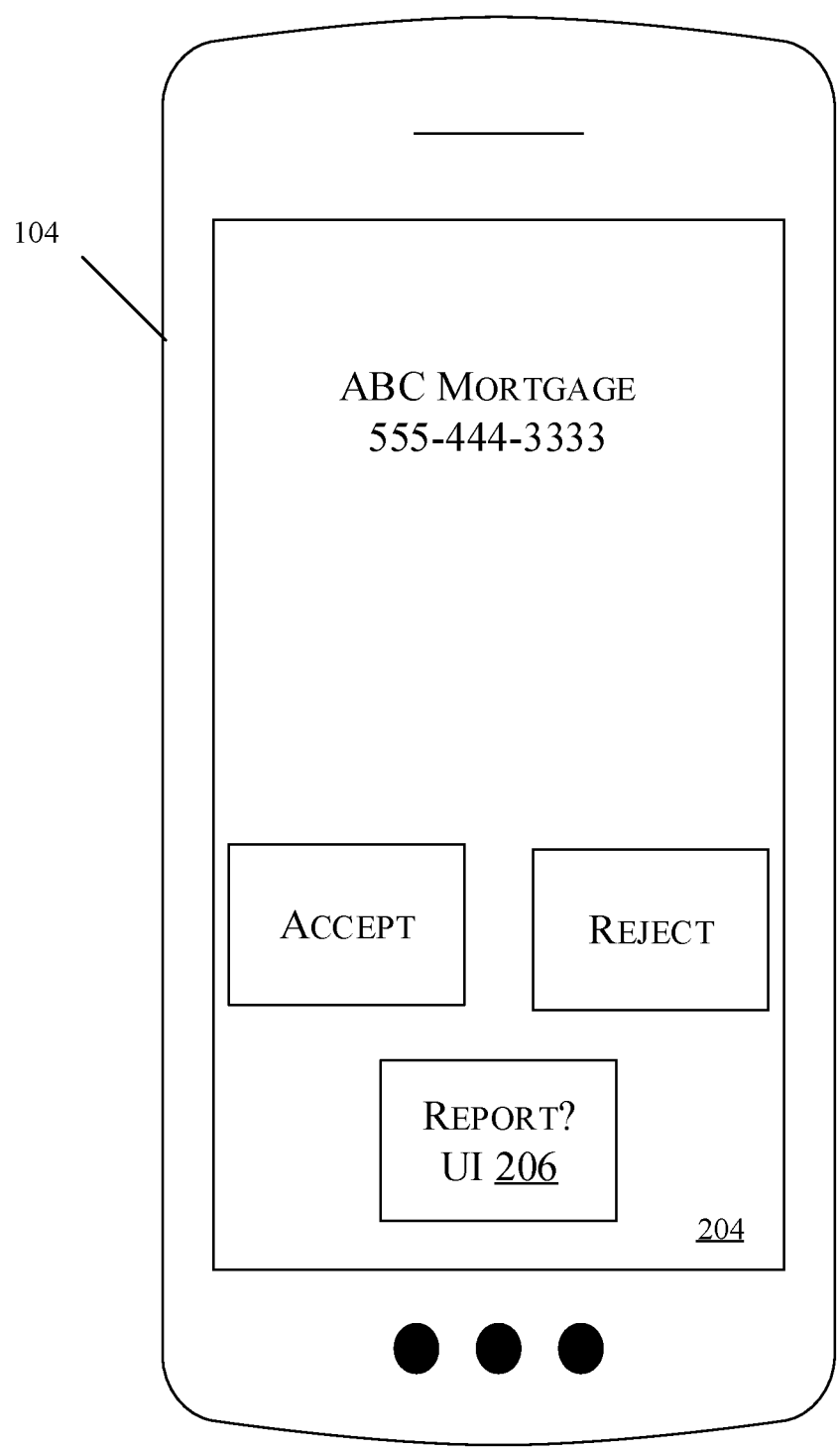

Referring to FIG. 2B, in configurations, the user may selectively report calls from various originating phone numbers based on interacting with a UI 206 that may appear on a display 204 of the device 104 when a call is received. The UI 206 may also appear on the display 204 of the user's mobile device 104 when the user is currently on another call and the call is received. The report list 122 may include originating numbers that a user may wish to block and unblock, as will be described herein. The reported phone number may be passed along the Ut interfaces 110, 116 to the TAS 114 and placed on the report list 122 of reported numbers for the user. In particular, an XCAP based PUT or POST message may be forwarded to the TAS 114 and/or the third-party application server 118 for updating the report list 122.

Figure 2C:
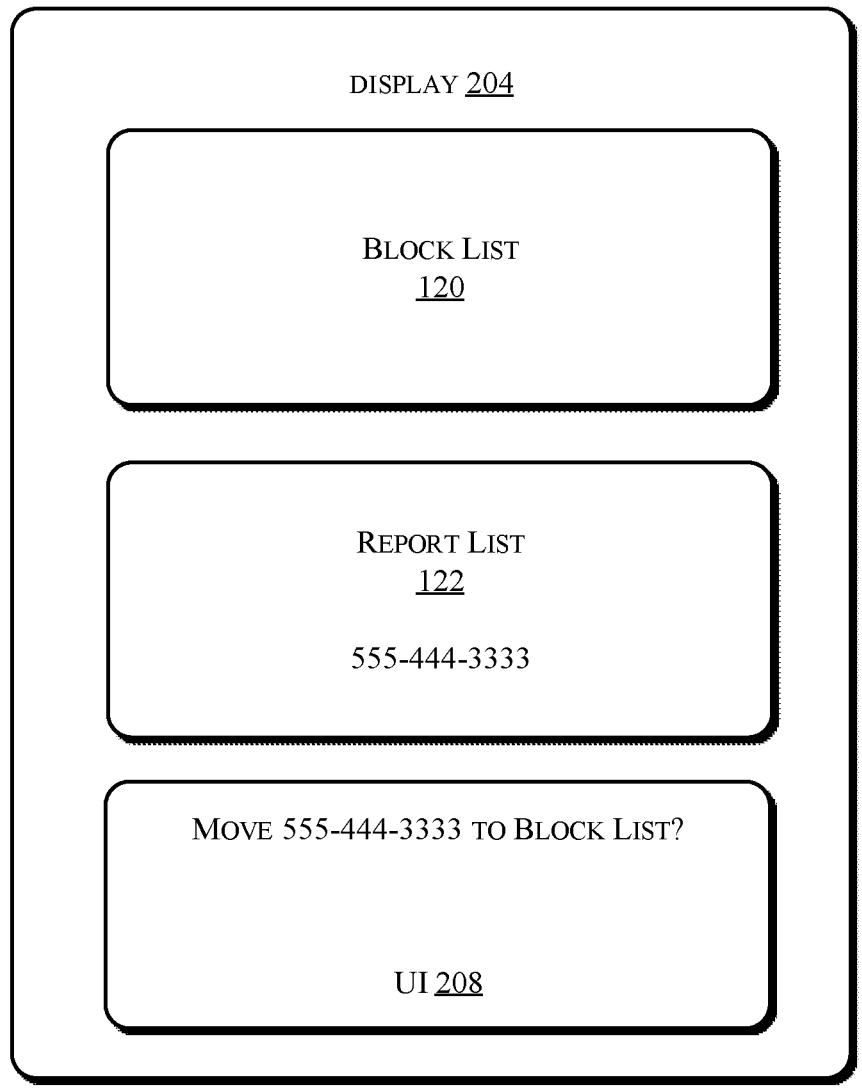

In configurations, Referring to FIG. 2C, the user may interact with a UI 208 to move numbers from the report list 122 to the block list 120. In configurations, the UI 208 may be an internet UI that allows the user to move numbers among the lists, e.g., by accessing an account of the user. The UI 208 may be displayed on the display 204 of the user device 104 or may be displayed on a display of another computing device (not illustrated). Thus, for example, a number on the report list 122 may be moved to the block list 120 so that future calls from the number will be blocked. The user may then, at a future date, interact with the UI 208 to move the number from the block list 120 to the report list 122 so that calls from that number will be forwarded by the TAS 114 to the user's user device 104. Thus, the report list 122 may include numbers associated with, for example, work-related parties, family members, friends, etc. For example, if the user is going on vacation, they may wish to move numbers on the report list 122 associated with work-related parties to the block list 120, and then back to the report list 122 when they are back from vacation.

Figure 2D:
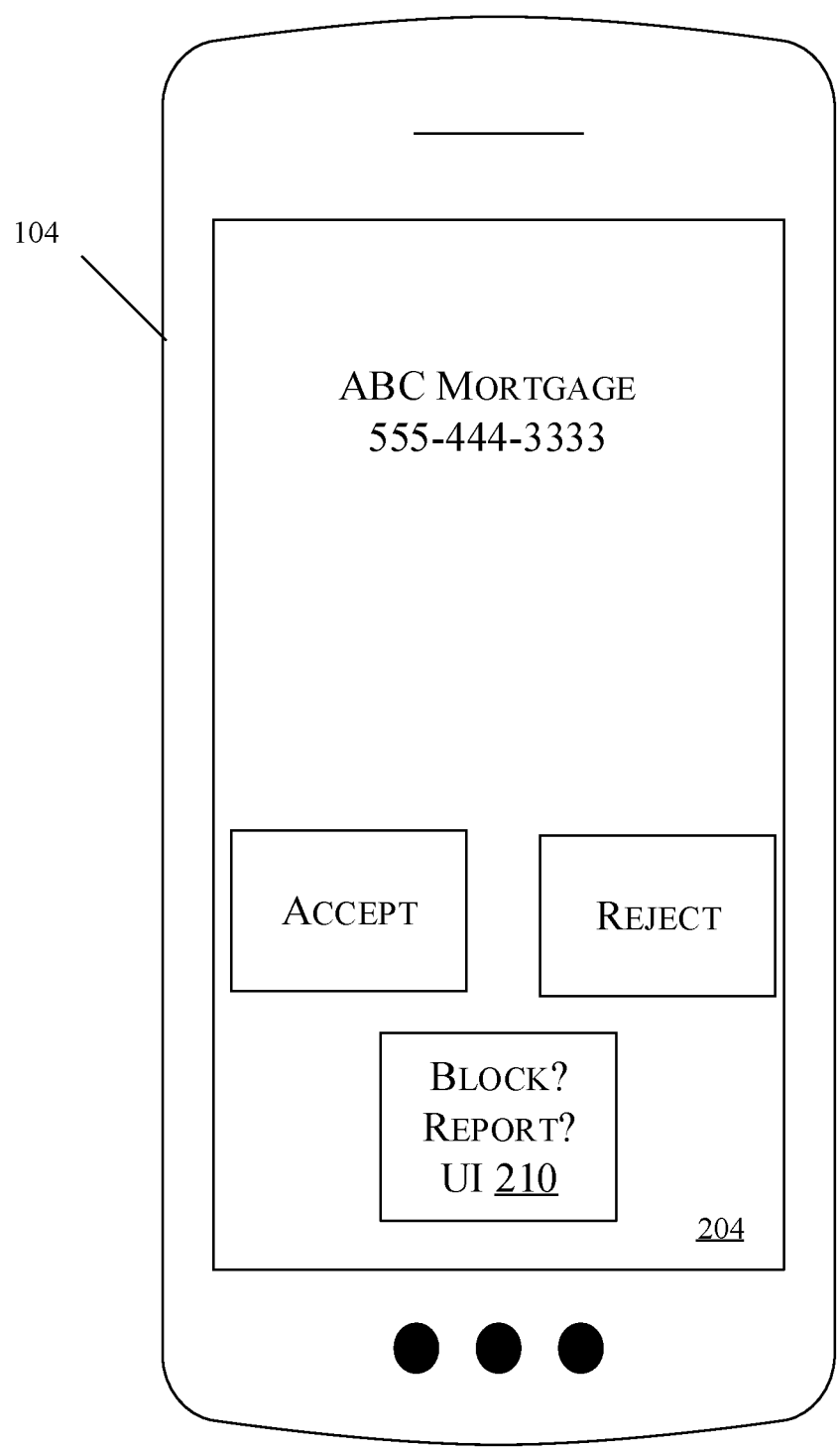

Referring to FIG. 2D, a UI 210 may be provided that offers the user a choice to either add the originating number to the block list 120 or to the report list 122. The UI 210 may also appear on the display 204 of the user's mobile device 104 when the user is currently on another call. Interaction with the UI 210 causes the particular phone number to be passed along the Ut interfaces 110, 116 to the TAS 114 and/or the third-party application server 118, as previously described, and placed on either the block list 120 or the report list 122 for the user, depending on the selection of the user.

Figure 3:
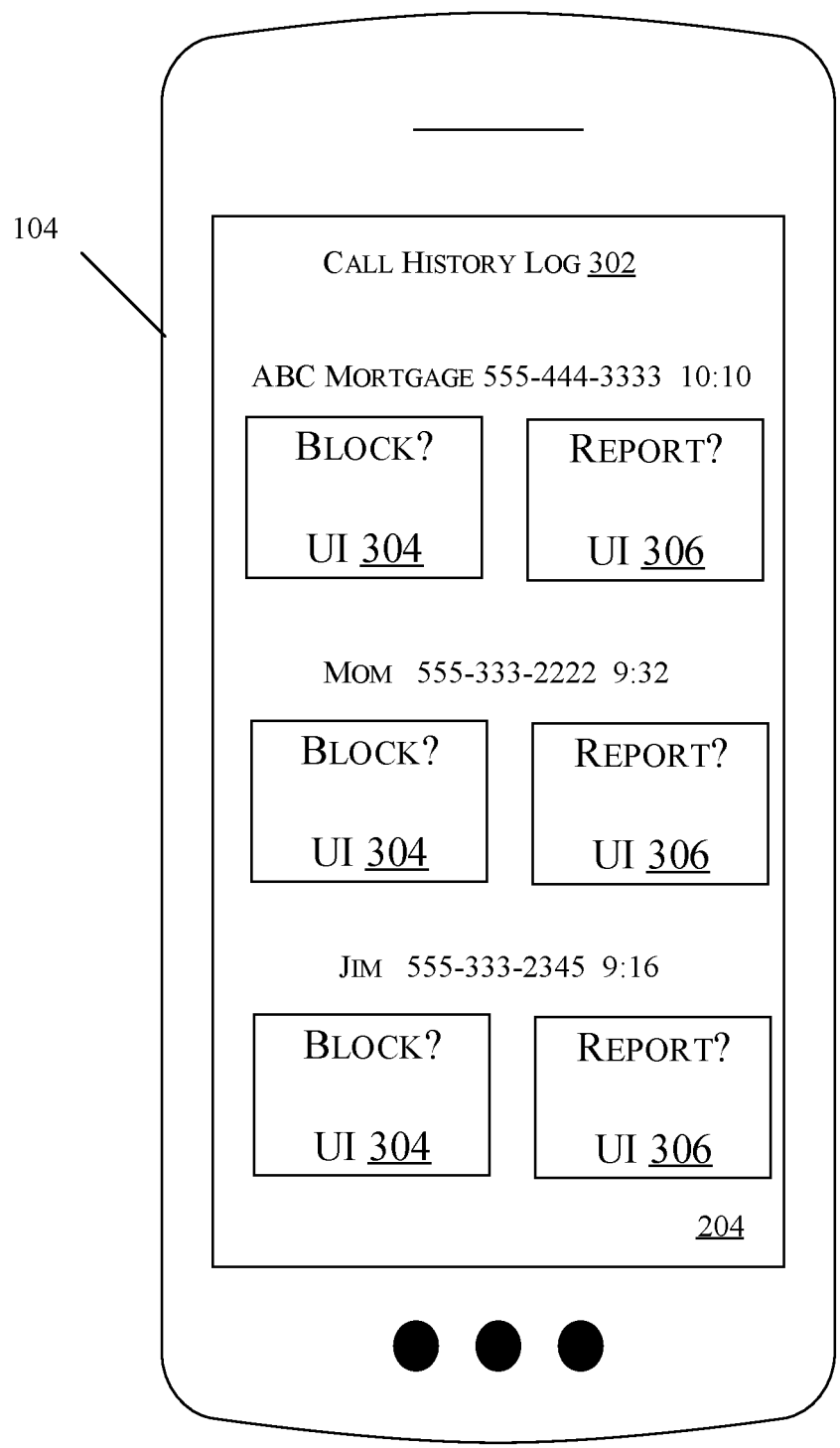
FIG. 3 is a pictorial diagram of an example user device configured to provide UIs to a user while the user is viewing a call history log to implement network-controlled scam/robocall handling, as well as other potential unwanted calls, in accordance with various configurations.

Referring to FIG. 3, in configurations, an option to block future calls from a particular phone number may be presented to the user when the user is reviewing a call history log 302 on the display 204 of user device 104. The user may interact with a UI 304 to block future calls from the particular number and/or all phone numbers associated with the party associated with the particular phone number. Also, a UI 306 may be provided to report the particular number. As is known, other UIs are generally included with the call history log 302 but are not illustrated in FIG. 3 for clarity. Interaction with either UI 304 or UI 306 causes the particular phone number to be passed along the Ut interfaces 110, 116 to the TAS 114 and/or the third-party application server 118, as previously described, and placed on either the block list 120 or the report list 122 for the user. The UIs 304 and 306 may be a single UI providing the user with an option to either block the particular number and/or all phone numbers associated with the party associated with the particular phone number or report the particular number and/or all phone numbers associated with the party associated with the particular phone number. A similar UI 304 and/or 306, either alone or combined, may also be included with phone numbers listed in a contact list or address book (not illustrated) of the user that may be displayed on the display 204 of the user device 104.

In configurations, when a particular number and/or a particular party is selected to be blocked or reported by interacting with one of the UIs 202, 206, 210, 304 and 306, the user may be prompted as to how long the user wishes for the particular number and/or the particular party to be blocked, e.g., six hours, 24 hours, one week, permanently, etc. The option may be presented in a drop-down menu or UI when the user interacts with one of the UIs 202, 206, 210, 304 and 306. In configurations, the drop-down menu or UI may simply ask if the user wants to permanently block or report the number(s) or temporarily block or report the number(s). The network 100 may set the temporary time limit as a default, e.g., 6 hours, 12 hours, 24 hours, 1 week, 1 month, etc. After the selected amount of time has expired, the TAS 114 may then once again allow calls from the blocked number(s) to be forwarded to the user's user device 104 or may remove the number(s) from the report list 122. In configurations, after the selected amount of time has expired, the user may be prompted as to whether the user wishes for the number(s) to remain on the block list 120 or the report list 122. Likewise, when a user interacts with a UI 208 to move number(s) from the report list 122 to the block list 120, the user may be prompted as to how long the user wishes for the particular number and/or the particular party to be placed on the block list 120 from the report list 122, e.g., six hours, 24 hours, one week, permanently, etc. After the selected amount of time has expired, the TAS 114 may then move the blocked number(s) from the block list 120 to the report list 122 or ask if the user wishes for the number(s) to remain blocked.

Figure 4:
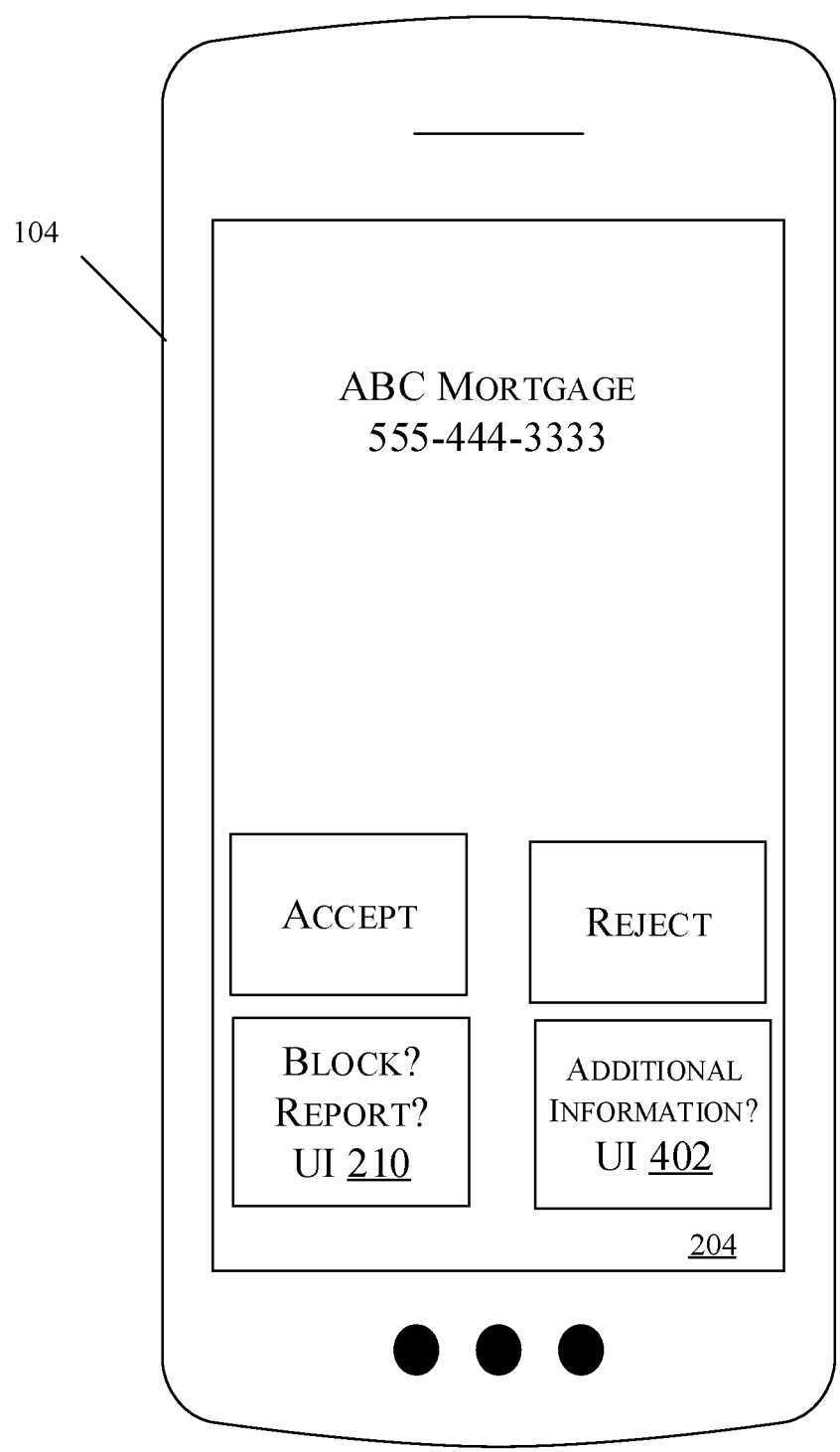
FIG. 4 is a pictorial diagram of an example user device configured to provide UIs to a user to request additional information related to a phone number, in accordance with various configurations.

Referring to FIG. 4, in configurations, when a call from a particular number is received by a user on their user device 104, a UI 402 may be provided for the user to request additional information before accepting the call. The UI 402 may also be provided for numbers listed in the call history log 302. The request for additional information may be passed along the Ut interfaces 110, 116 to the TAS 114 using an XCAP based GET message. The TAS 114 or the third-party application server 118 may provide additional information along the Ut interfaces as to the type of party from which the call is being received, e.g., a telemarketer, a politician, etc., back to the user's user device 104 and the user may reject the call, accept the call, report the call and/or block the call as previously described, either directly or from the call history log 302. In particular, the additional caller information offers both additional caller information (e.g., telemarketer, political etc.) and/or the option to authenticate incoming calls from third-party applications that may be provided by one or more third-party application servers 118. The TAS 114 may invoke local or third-party network elements to fetch additional information on the caller. The user may, upon checking the additional caller info, add the particular number to the block list 120 or the report list 122.

In configurations, while blocked calls may not be forwarded to the user's user device 104, an indication may be provided by the network 100 in the user device's call history log 302 that a call was attempted by a blocked number (or another number of a blocked party). Thus, an option may be provided within the call history log 302 for the user to unblock the number and/or party.

Thus, in configurations, the TAS 114 analyzes incoming phone calls for a user device 104 to determine if the call is originating from a number or a party that is on the block list 120. In configurations, the TAS 114 may invoke an application programming interface (API) such that a third-party software platform, e.g., the third-party application server, performs the analysis. If the call is originating from a number or a party that is on the block list 120, the TAS 114 blocks the call from the user device 104. Otherwise, the TAS 114 forwards the call to the user device 104.

Figure 5:
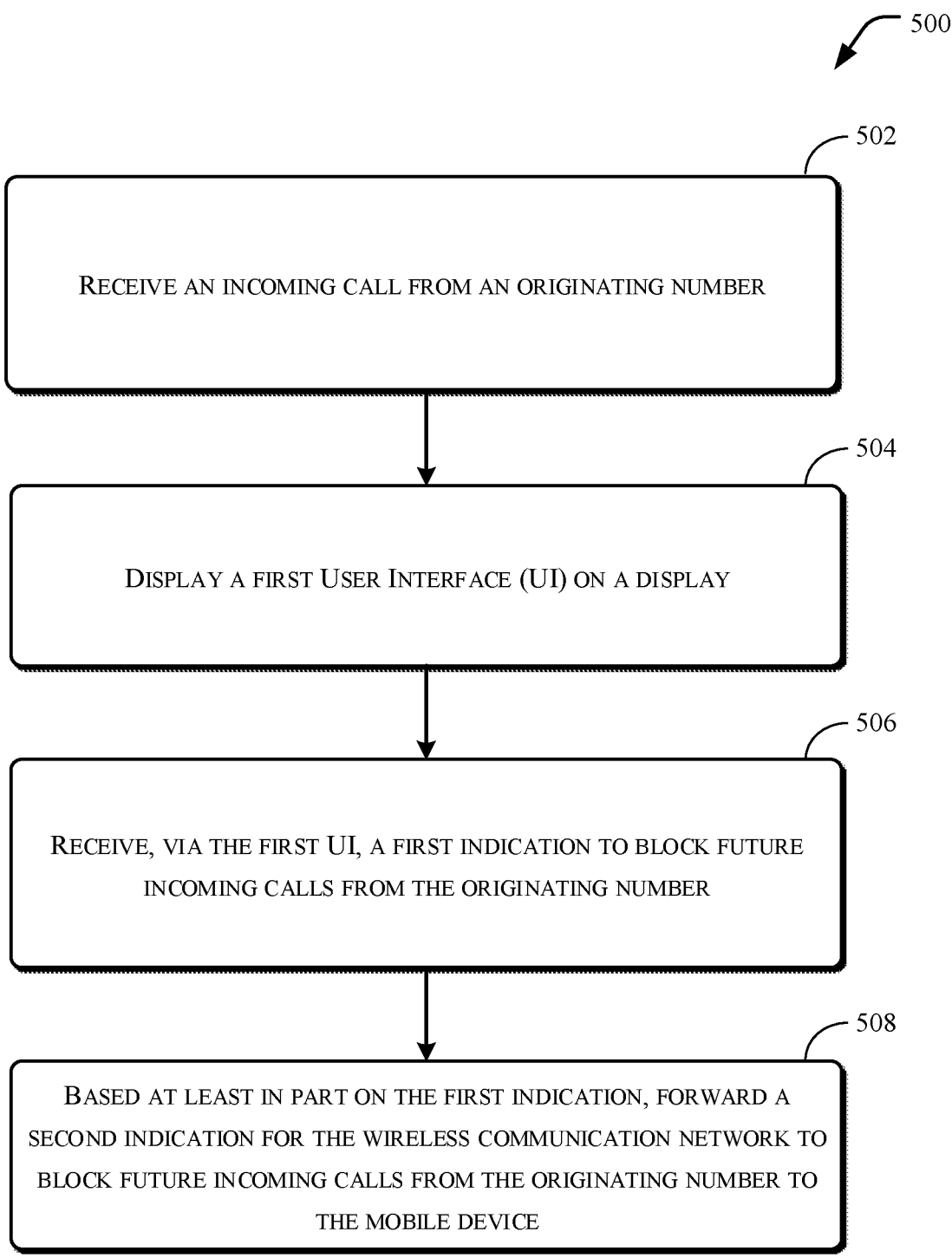
FIG. 5 is a flow diagram of an example process for network-based handling of scam calls and robocalls, as well as other potential unwanted calls, in accordance with various configurations.

FIG. 5 is a flow diagram of an illustrative process that may be implemented within or in association with the arrangements of FIGS. 1-4. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 5 is a flow diagram illustrating an example method 500 for network-based handling of scam calls and robocalls, as well as other potential unwanted calls, at the network level within a wireless communication network, e.g., wireless communication network 100. At block 502, an incoming call is received from an originating number. For example, a mobile device, e.g., user device 104, may receive a call within the wireless communication network. At block 504, a first User Interface (UI), e.g., UI 202, is displayed on a display, e.g. display 204, of the mobile device. The first UI provides an option to a user to block future incoming calls from the originating number.

At block 506, a first indication is received, via the first UI, to block future incoming calls from the originating number. For example, a user may interact with the first UI to indicate that the originating number should be blocked and added to a block list, e.g., block list 120, for the mobile device. At block 508, based at least in part on the first indication, a second indication is forwarded from the mobile device for the wireless communication network to block future incoming calls from the originating number to the mobile device. For example, the second indication may be forwarded from the mobile device to the TAS 114 and the TAS 114 may add the originating number to the block list for the mobile device. When future calls from the originating number are directed to the mobile device, the TAS 114 may check the block list for the mobile device and upon seeing that the originating number is on the block list for the mobile device, block the call from the originating number to the mobile device.

Accordingly, when the user blocks calls from a particular number and/or a particular party associated with the particular number, the user device 104 may push the desired blocking option along a Ut interface, e.g., Ut interfaces 110, 116, of the wireless communication network 100 to the TAS 114 to add the particular number and/or the particular party associated with the particular number to the block list 120. When an incoming call from the particular number is received, the TAS 114 may perform analysis, or invoke a third-party platform to perform the analysis, e.g., using the third-party application server 118, to determine whether the incoming call is from the particular number on the report list 120. Depending on the analysis, the TAS 114 may then block future calls from the particular number and/or all phone numbers associated with the particular party associated with the particular number. Thus, instead of the user device 104 blocking incoming calls from a particular number, the network 100 itself may block incoming calls from proceeding to the user device 104.

Network-based blocking of calls at the network level benefits the user in that unwanted calls received at the user device 104 are reduced. Furthermore, use of network resources and user device resources is reduced. For example, network bandwidth is not used to deliver calls that are known to be unwanted by the user. On the user device, radio resource utilization and battery utilization are improved. For example, if a user device is in an idle mode, sleep mode, or other low power mode, the user device will not switch to an active mode to receive unwanted calls. Accordingly, battery life of the user device will improve.

The features described herein may be provided on the user's user device directly by the user device 104, e.g., via firmware and/or software, or an application, e.g., software. For legacy user devices, the operator of the wireless communication network 100 may push an application onto the legacy user device to provide the capabilities described herein to the legacy user device.

For example, some legacy user devices do not support the Ut interface during an incoming call or while the user device is engaged in a current call. Thus, the ability to block and/or report an originating number from an incoming call is suppressed by such a legacy user device. Newer user devices 104 include the ability to support the Ut interface during incoming calls and/or during current calls. Thus, the operator of the wireless communication network 100 may push an application onto legacy user devices to provide the Ut functionality to the legacy user devices during an incoming call or while the user device is engaged in a current call.

User device 104 may be implemented as any suitable mobile computing device configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), a networked digital camera, and/or similar mobile devices. Although this description predominantly describes the user device 104 as being "mobile" (i.e., configured to be carried and moved around), it is to be appreciated that the user device 104 may represent various types of communication devices that are generally stationary as well, such as televisions, desktop computers, game consoles, set top boxes, Internet of Things (IoT) devices, and the like. In this sense, the terms "communication device," "wireless device," "wireline device," "mobile device," "computing device," and "user equipment (UE)" may be used interchangeably herein to describe any communication device capable of performing the techniques described herein. Furthermore, the user device 104 may be capable of communicating over wired networks, and/or wirelessly using any suitable wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), 5G, IEEE 802.1x protocols, WiMAX, Wi-Fi, and/or any future IP-based network technology or evolution of an existing IP-based network technology.

Figure 6:
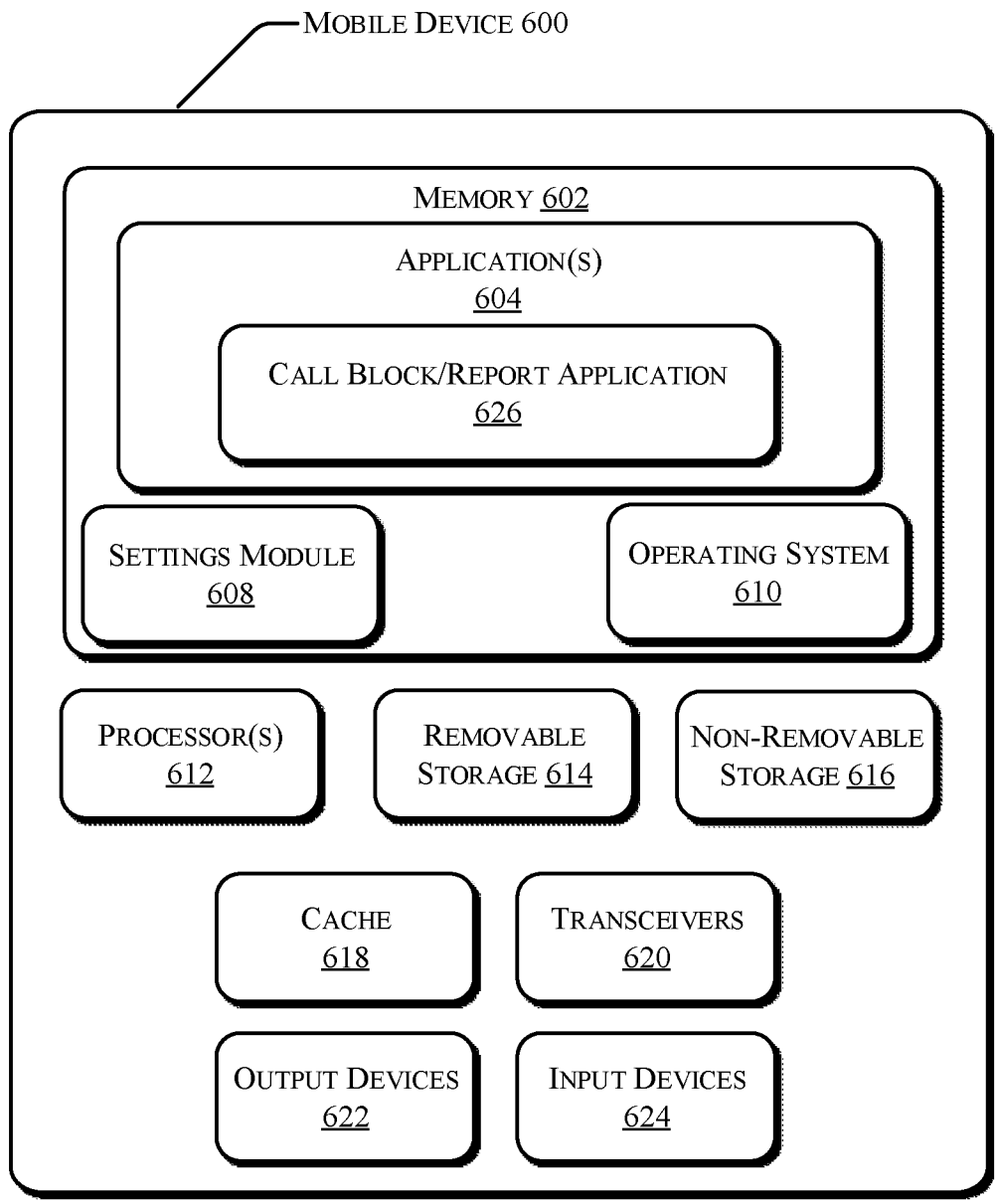
FIG. 6 schematically illustrates a component level view of an example mobile device configured for use in the wireless communication network of FIG. 1, in accordance with various configurations.

FIG. 6 schematically illustrates a component level view of a mobile device 600, such as mobile device 104, configured to function within wireless communication network 100. As illustrated, the mobile device 600 comprises a system memory 602, e.g., computer-readable media, storing application(s) 604, e.g., a call block/report application 626 that implements functions and UIs as described herein. Alternatively, the functions and UIs may be implemented, wholly or in part, via firmware (not illustrated). The mobile device also comprises a settings module 608, and an operating system 610. Also, the mobile device 600 includes processor(s) 612, a removable storage 614, a non-removable storage 616, cache 618, transceivers 620, output device(s) 622, and input device(s) 624. In various implementations, system memory 602 is volatile (such as RAM), non-volatile (such as ROM, flash memory, etc.) or some combination of the two. In some implementations, the processor(s) 612 is a central processing unit (CPU), a graphics processing unit (GPU), or both CPU and GPU, or any other sort of processing unit.

The mobile device 600 may also include additional data storage devices (removable and/or non-removable) such as, for example, magnetic disks, optical disks, or tape. Such additional data storage may include removable storage 614 and non-removable storage 616. Additionally, the mobile device 600 includes cache 618.

Non-transitory computer-readable media may include volatile and nonvolatile, removable and non-removable tangible, physical media implemented in technology for storage of information, such as computer readable instructions, data structures, program modules, or other data. System memory 602, removable storage 614, non-removable storage 616 and cache 618 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the mobile device 600. Any such non-transitory computer-readable media may be part of the mobile device 600. The processor(s) 612 may be configured to execute instructions, which may be stored in the non-transitory computer-readable media or in other computer-readable media accessible to the processor(s) 612.

In some implementations, the transceivers 620 include any sort of transceivers known in the art. For example, the transceivers 620 may include a radio transceiver that performs the function of transmitting and receiving radio frequency communications via an antenna (not shown). Also, or alternatively, the transceivers 620 may include wireless modem(s) to facilitate wireless connectivity with other computing devices. Further, the transceivers 620 may include wired communication components, such as an Ethernet port, for communicating with other networked devices.

In some implementations, the output devices 622 include any sort of output devices known in the art, such as a display (e.g., a liquid crystal display), speakers, a vibrating mechanism, or a tactile feedback mechanism. Output devices 622 also include ports for one or more peripheral devices, such as headphones, peripheral speakers, or a peripheral display.

In various implementations, input devices 624 include any sort of input devices known in the art. For example, input devices 624 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 624 may be used to enter preferences of a user of the mobile device 600 to define how the user wishes certain calls from third parties to be handled by the wireless communication network, as previously described herein.

Figure 7:
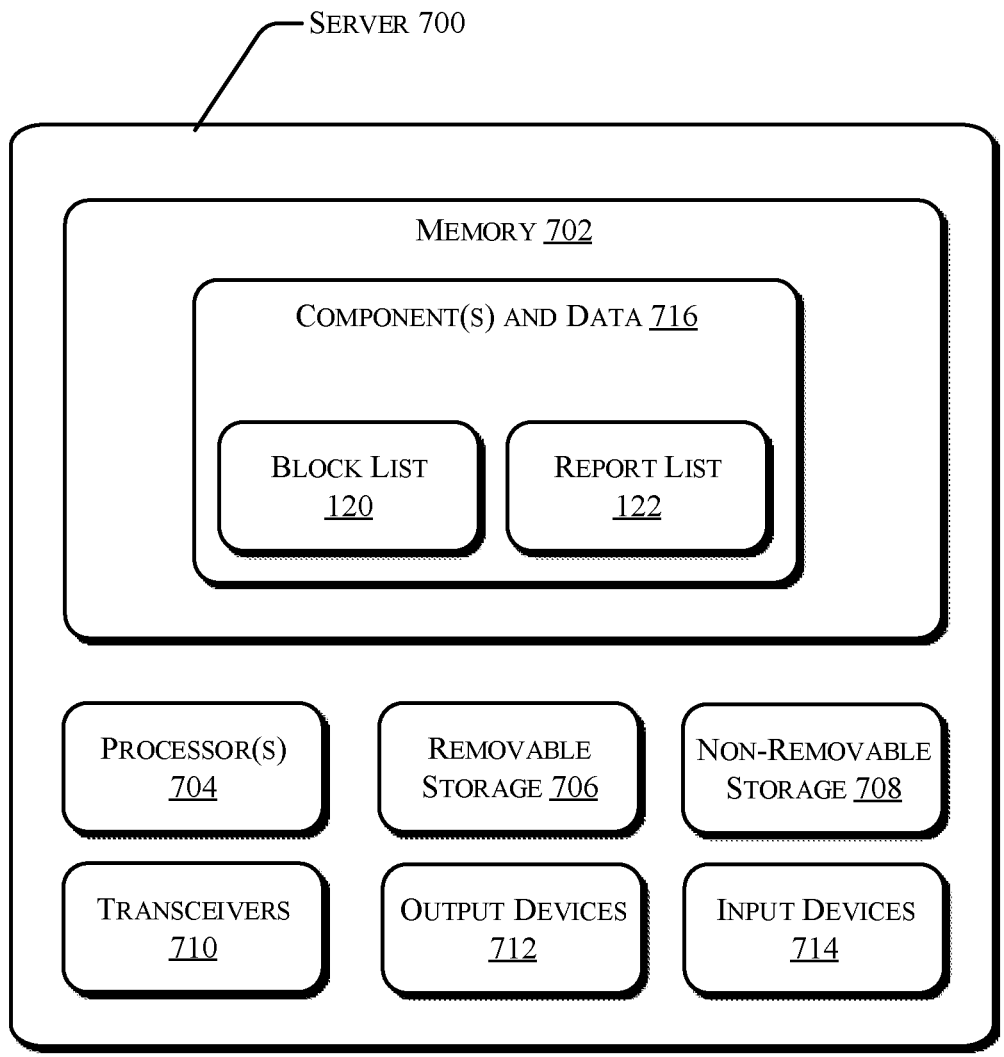
FIG. 7 schematically illustrates a component level view of a server configured for use in the wireless communication network of FIG. 1 to provide various services of the wireless communication network of FIG. 1, in accordance with various configurations.

FIG. 7 illustrates a component level view of a server 700 configured for use within a wireless communication network, e.g., wireless communication network 100 in order to provide various services within the wireless communication network, according to the techniques described herein. For example, the server 700 may serve as the TAS 114 or the third-party application server 118, e.g., one or more servers 700 may be configured to serve as the TAS 114 or the third-party application server 118. As illustrated, the server 700 comprises a system memory 702 that may store one or more components and/or applications and data 716 for interacting with mobile devices 700, e.g., mobile devices 104, as described herein. For example, the one or more components and/or applications and data 716 may include the block list 120 and the report list 122. Also, the server 700 may include processor(s) 704, a removable storage 706, a non-removable storage 708, transceivers 710, output device(s) 712, and input device(s) 714.

In various implementations, system memory 702 is volatile (such as RAM), non-volatile (such as ROM, flash memory, etc.), or some combination of the two. In some implementations, the processor(s) 704 is a Central Processing Unit (CPU), a Graphics Processing Unit (GPU), or both CPU and GPU, or any other sort of processing unit.

The server 700 may also include additional data storage devices (removable and/or non-removable) such as, for example, magnetic disks, optical disks, or tape. Such additional storage is illustrated in FIG. 7 by removable storage 706 and non-removable storage 708. The one or more of the memory 702, the removable storage 706 and/or the non-removable 708 may include module(s) and data 716 (illustrated in the memory 702). The module(s) and data 716 may include instructions executable by, for example, the processor(s) 704.

Non-transitory computer-readable media may include volatile and nonvolatile, removable and non-removable tangible, physical media implemented in technology for storage of information, such as computer readable instructions, data structures, program modules, or other data. System memory 702, removable storage 706 and non-removable storage 708 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 700. Any such non-transitory computer-readable media may be part of the server 700.

In some implementations, the transceivers 710 include any sort of transceivers known in the art. For example, the transceivers 710 may include wired communication components, such as an Ethernet port, for communicating with other networked devices. Also, or instead, the transceivers 710 may include wireless modem(s) to facilitate wireless connectivity with other computing devices. Further, the transceivers 710 may include a radio transceiver that performs the function of transmitting and receiving radio frequency communications via an antenna.

In some implementations, the output devices 712 include any sort of output devices known in the art, such as a display (e.g., a liquid crystal display), speakers, a vibrating mechanism, or a tactile feedback mechanism. Output devices 712 also include ports for one or more peripheral devices, such as headphones, peripheral speakers, or a peripheral display.

In various implementations, input devices 714 include any sort of input devices known in the art. For example, input devices 714 may include a camera, a microphone, a keyboard/keypad, a computer mouse, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Some or all operations of the processes described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like. Memory 604 and memory 702 are examples of computer storage media.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

A non-transient computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more non-transitory computer storage media that, when executed by one or more processors, may perform operations described above with reference to FIGS. 1-5. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   receiving, at a mobile device, an incoming call from an originating number;
   displaying, on a display of the mobile device, a first user interface (UI), the first UI providing an option to a user to block future incoming calls from the originating number;
   receiving, via the first UI, a first indication to block future incoming calls from the originating number;
   based at least in part on the first indication, forwarding, by the mobile device to a wireless communication network, a second indication for the wireless communication network to block future incoming calls from the originating number to the mobile device;
   receiving the incoming call from the originating number while the mobile device is engaged in a current call; and
   displaying the first UI on the mobile device during the current call.

2. The method of claim 1, further comprising:
   displaying, on the display of the mobile device, a call history log; and
   displaying, on the display of the mobile device, a second UI, the second UI providing an option to block future incoming calls from a particular number displayed in the call history log.

3. The method of claim 1, further comprising:
   displaying, on the display of the mobile device, a second UI, the second UI providing an option to request additional information from the wireless communication network related to the originating number;
   receiving, via the second UI, a third indication to request the additional information related to the originating number;
   based at least in part on the third indication, forwarding, by the mobile device to the wireless communication network, the request for the wireless communication network to provide the additional information related to the originating number; and
   receiving, at the mobile device from the wireless communication network, the additional information.

4. The method of claim 3, wherein the first indication to block future incoming calls from the originating number is based at least in part on the additional information.

5. The method of claim 1, further comprising:
based at least in part on the first indication, displaying a second UI, the second UI providing an option for a length of time to block future incoming calls from the originating number.

6. The method of claim 1, further comprising:
receiving, at the mobile device, an incoming call from another originating number
displaying, on the display of the mobile device, a second UI, the second UI providing an option to report the other originating number to the wireless communication network;
receiving, via the second UI, a third indication to report the other originating number; and
based at least in part on the third indication, forwarding, by the mobile device to the wireless communication network, a fourth indication for the wireless communication network to include the other originating number on a report related to the mobile device.

7. The method of claim 6, further comprising:
displaying, on the display of the mobile device, a third UI, the third UI providing an option to move one or more numbers on the report to a list that includes numbers to be blocked for calls by the wireless communication network to the mobile device.

8. The method of claim 7, further comprising:
displaying, on the display of the mobile device, a fourth UI, the fourth UI providing an option to move one or more numbers from the list to the report to unblock the one or more numbers for calls by the wireless communication network to the mobile device.

9. A mobile device comprising:
one or more processors; and
a non-transitory storage medium comprising instructions stored thereon, the instructions being executable by the one or more processors to:
receive an incoming call from an originating number;
display, on a display of the mobile device, a first user interface (UI), the first UI providing an option to a user to block future incoming calls from the originating number;
receive, via the first UI, a first indication to block future incoming calls from the originating number;
based at least in part on the first indication, forward, to a wireless communication network, a second indication for the wireless communication network to block future incoming calls from the originating number to the mobile device;
display, on the display of the mobile device, a second UI, the second UI providing an option to request additional information from the wireless communication network related to the originating number;
receive, via the second UI, a third indication to request the additional information related to the originating number;
based at least in part on the third indication, forward, by the mobile device to the wireless communication network, the request for the wireless communication network to provide the additional information related to the originating number; and
receive, at the mobile device from the wireless communication network, the additional information,
wherein the first indication to block future incoming calls from the originating number is based at least in part on the additional information.

10. The mobile device of claim 9, wherein the instructions are further executable by the one or more processors to:
receive the incoming call from the originating number while the mobile device is engaged in a current call; and
display the first UI on the mobile device during the current call.

11. The mobile device of claim 9, wherein the instructions are further executable by the one or more processors to:
display, on the display of the mobile device, a call history log; and
display, on the display of the mobile device, a third UI, the third UI providing an option to block future incoming calls from a particular number displayed in the call history log.

12. The mobile device of claim 9, wherein the instructions are further executable by the one or more processors to:
based at least in part on the first indication, display a third UI, the third UI providing an option for a length of time to block future incoming calls from the originating number.

13. The mobile device of claim 9, wherein the instructions are further executable by the one or more processors to:
receive, at the mobile device, an incoming call from another originating number;
display, on the display of the mobile device, a third UI, the third UI providing an option to report the other originating number to the wireless communication network;
receive, via the third UI, a fourth indication to report the another originating number; and
based at least in part on the fourth indication, forward, by the mobile device to the wireless communication network, a fifth indication for the wireless communication network to include the other originating number on a report related to the mobile device.

14. The mobile device of claim 13, wherein the instructions are further executable by the one or more processors to:
display, on the display of the mobile device, a fourth UI, the fourth UI providing an option to move one or more numbers on the report to a list that includes numbers to be blocked for calls by the wireless communication network to the mobile device; and
display, on the display of the mobile device, a fifth UI, the fifth UI providing an option to move one or more numbers from the list to the report to unblock the one or more numbers for calls by the wireless communication network to the mobile device.

15. A non-transitory storage medium comprising instructions stored thereon, the instructions being executable by one or more processors to:
receive an incoming call from an originating number;
display, on a display of a mobile device including the non-transitory storage medium, a first user interface (UI), the first UI providing an option to a user to block future incoming calls from the originating number;
receive, via the first UI, a first indication to block future incoming calls from the originating number;
based at least in part on the first indication, forward, to a wireless communication network, a second indication for the wireless communication network to block future incoming calls from the originating number to the mobile device;

receive the incoming call from the originating number while the mobile device is engaged in a current call; and display the first UI on the mobile device during the current call.

16. The non-transitory storage medium of claim 15, wherein the instructions are further executable by the one or more processors to:

display, on the display of the mobile device, a call history log; and display, on the display of the mobile device, a second UI, the second UI providing an option to block future incoming calls from a particular number displayed in the call history log.

17. The non-transitory storage medium of claim 15, wherein the instructions are further executable by the one or more processors to:

display, on the display of the mobile device, a second UI, the second UI providing an option to request additional information from the wireless communication network related to the originating number;

receive, via the second UI, a third indication to request the additional information related to the originating number;

based at least in part on the third indication, forward, by the mobile device to the wireless communication network, the request for the wireless communication network to provide the additional information related to the originating number; and receive, at the mobile device from the wireless communication network, the additional information, wherein the first indication to block future incoming calls from the originating number is based at least in part on the additional information.

* * * * *